(12) United States Patent
Gibson et al.

(10) Patent No.: US 7,277,789 B1
(45) Date of Patent: Oct. 2, 2007

(54) SYSTEM FOR TRANSMITTING SIGNALS BETWEEN AN ENGINE CONTROL UNIT AND A VALVE CONTROL UNIT

(75) Inventors: Alex Gibson, Ann Arbor, MI (US); Ilya Kolmanovsky, Novi, MI (US); Brian Moorhead, Willis, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/428,945

(22) Filed: Jul. 6, 2006

(51) Int. Cl.
*B60T 7/12* (2006.01)
*G06F 19/00* (2006.01)

(52) U.S. Cl. .................................... 701/104; 701/112
(58) Field of Classification Search ................ 701/101, 701/103, 104, 111, 112, 114, 115; 123/321, 123/345, 347, 90.15
See application file for complete search history.

(56) References Cited

U.S. PATENT DOCUMENTS

| | | | |
|---|---|---|---|
| 4,931,322 A * | 6/1990 | Yamamoto et al. | 427/424 |
| 6,278,932 B1 | 8/2001 | Baumel et al. | |
| 6,435,147 B1 | 8/2002 | Eichenseher et al. | |
| 6,574,545 B2 | 6/2003 | Hartke et al. | |
| 6,831,637 B1 * | 12/2004 | Mack | 345/419 |
| 6,848,403 B2 | 2/2005 | Litorell | |
| 6,866,012 B2 | 3/2005 | Hayase et al. | |
| 2006/0095233 A1 * | 5/2006 | Carr et al. | 702/185 |

* cited by examiner

*Primary Examiner*—John T. Kwon
(74) *Attorney, Agent, or Firm*—Donald J. Lewis

(57) ABSTRACT

A system for communicating information between a first controller and a second controller is presented. The system is designed to improve and increase the robustness data transferred between two controllers.

22 Claims, 5 Drawing Sheets

SYSTEM FOR TRANSMITTING SIGNALS BETWEEN AN ENGINE CONTROL UNIT AND A VALVE CONTROL UNIT

FIELD

The present description relates to a system for transferring information between a valve controller and an engine controller.

BACKGROUND

One system to control an engine during a condition of valve actuator failure is described in U.S. Pat. No. 6,278,932. The system description presents a way to deactivate a bank of cylinders in response to a valve actuator failure. In addition, an actuator controller is provided for each bank of the engine and each controller is configured to operate valves, fuel injection, and ignition if communication between the actuator controller and engine controller is disrupted.

The above-mentioned method can also have a disadvantage. For example, the system uses a single CAN data bus to communicate between the valve controllers and the engine controller. This configuration may be adequate during some conditions but may be inadequate during others; such as, when a valve is degraded. Generally, control and status commands for each cylinder are sent between the valve controller and the engine controller. The commands and status may be updated as often as each cylinder event. If a valve stays open or does not open, it may be desirable to inhibit spark in a cylinder while the valve is not operating as desired. During these conditions, it may be desirable to inhibit spark within as little as forty crankshaft angle degrees after a valve has not closed, for example. However, if a request to inhibit a spark event is transmitted from a valve controller to an engine controller at higher engine speeds, then there is less time to communicate between cylinder events. Consequently, the amount of time available to transmit data between the valve controller and the engine controller decreases as engine speed increases. This can increase the possibility of late or undeliverable data. As a result, it may be possible for a combustion event to occur in a cylinder when an intake or exhaust valve is open.

The inventors herein have recognized the above-mentioned disadvantage and have developed a system that improves communication and data exchange between a valve controller and an engine controller.

SUMMARY

One example approach to overcome at least some of the disadvantages of prior approach includes a system for transferring information between a valve controller and an engine controller, the system comprising: an engine having a plurality of cylinders, combustion occurring in said cylinders in a predetermined order; a plurality of communication channels between a valve controller and an engine controller; each channel of said plurality of communication channels carrying data associated with at least a first cylinder and a second cylinder; and said first cylinder and said second cylinder separated in said predetermined order by at least another cylinder. The present description overcomes at least some disadvantages of the previously mentioned system.

Data transmission time and robustness can be improved, at least during some conditions, when cylinder data transmitted over a communication channel includes a select group of cylinders. For example, when cylinder data transfer is based, at least in part, on the engine firing order, then data can be transferred more reliably. Further, when a communication channel is assigned to transfer data between a valve control unit (VCU) and an engine controller for a group of cylinders, the data transfer can be more reliable if cylinders comprising the group are not consecutive in the engine firing order. For example, for a four cylinder engine having a firing order of 1-3-4-2, cylinders one and four can be grouped together as part of one communication channel. Notice that these cylinders are not consecutive in the engine firing order. Rather, they are separated by cylinder three. Likewise, cylinders three and two can be grouped together as part of another communication channel and are not consecutive in the firing order. Assigning cylinder data to communication channels in this way increases the amount of time that data can be transmitted for a specific cylinder. For example, there can be nearly 360 degrees of crankshaft rotation allotted to communication for each channel in the prior example. In this example, the communication duration is based on the number of intake valve events that occur during an engine revolution since valve commands are sent out prior to every intake event. On the other hand, if cylinder one was grouped with either cylinder three or two, there can be less than 180 crankshaft degrees to communicate between the VCU and engine controller. This system allows the time available for data transmission to increase by ensuring that communication over a channel is limited to cylinders that are not consecutive in the engine firing order. Selecting cylinders for a data channel in this manner increases the number of crankshaft angular degrees between cylinders that are part the same communication channel. Thus, the amount of communication time between a VCU and engine controller may be increased by providing a plurality of communication channels and by selectively grouping cylinders based on the engine firing order.

The present description provides several advantages. In particular, the method increases the amount of time available to transmit engine data during a cycle of an engine. In addition, the system also reduces the possibility of loosing cylinder data or the possibility that cylinder data arrives too late. Further still, the engine system response may be improved by the higher rate of communication.

The above advantages and other advantages, and features of the present description will be readily apparent from the following Detailed Description when taken alone or in connection with the accompanying drawings.

BRIEF DESCRIPTION OF THE DRAWINGS

The advantages described herein will be more fully understood by reading an example of an embodiment, referred to herein as the Detailed Description, when taken alone or with reference to the drawings, wherein.

DETAILED DESCRIPTION

Figure 1:
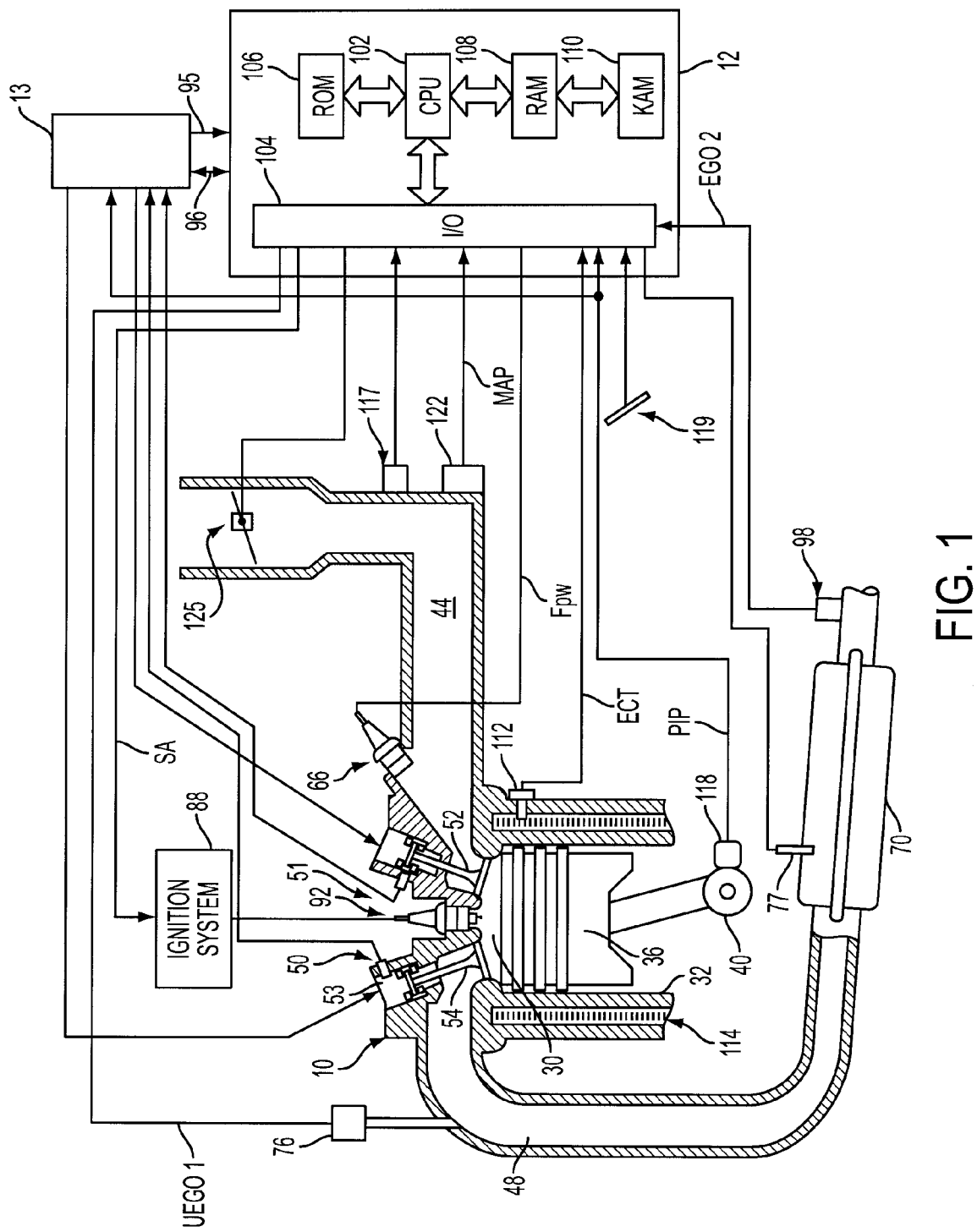
FIG. 1 is a schematic diagram of an engine.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is known communicating with intake manifold 44 and exhaust manifold 48 via respective intake valve 52 an exhaust valve 54.

Each intake and exhaust valve is operated by an electromechanically controlled valve coil and armature assembly 53. The valves are actuated and controlled by VCU 13, but they may be controlled by an engine controller if the VCU is eliminated. Alternatively, the intake 52 or exhaust 54 valve may be mechanically actuated via a camshaft, for example. Further, a device may be used to control valve lift and/or valve timing of mechanically actuated valves. Valve actuator armature temperature is determined by temperature sensor 51. Valve position is determined by position sensor 50. Valve position may be determined by linear variable displacement, discrete, or optical transducers or from actuator current measurements. In an alternative example, each valve actuator for valves 52 and 54 has a position sensor and a temperature sensor. In yet another alternative example, armature temperature may be determined from actuator power consumption since resistive losses can scale with temperature.

Intake manifold 44 is also shown having fuel injector 66 coupled thereto for delivering liquid fuel in proportion to the pulse width of signal FPW from controller 12. Fuel is delivered to fuel injector 66 by fuel system (not shown) including a fuel tank, fuel pump, and fuel rail (not shown). Alternatively, the engine may be configured such that the fuel is injected directly into the engine cylinder, which is known to those skilled in the art as direct injection. In addition, intake manifold 44 is shown communicating with optional electronic throttle 125.

Distributorless ignition system 88 provides ignition spark to combustion chamber 30 via spark plug 92 in response to controller 12. Universal Exhaust Gas Oxygen (UEGO) sensor 76 is shown coupled to exhaust manifold 48 upstream of catalytic converter 70. Alternatively, a two-state exhaust gas oxygen sensor may be substituted for UEGO sensor 76. Two-state exhaust gas oxygen sensor 98 is shown coupled to exhaust pipe 73 downstream of catalytic converter 70. Alternatively, sensor 98 can also be a UEGO sensor. Catalytic converter temperature is measured by temperature sensor 77, and/or estimated based on operating conditions such as engine speed, load, air temperature, engine temperature, and/or airflow, or combinations thereof.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, and read-only-memory 106, random-access-memory 108, 110 Keep-alive-memory, and a conventional data bus. Controller 12 is shown receiving various signals from sensors coupled to engine 10, in addition to those signals previously discussed, including: brake boost pressure (not shown); fuel vapor canister hydrocarbon concentration sensor (not shown); engine coolant temperature (ECT) from temperature sensor 112 coupled to water jacket 114; a position sensor 119 coupled to a accelerator pedal; a measurement of engine manifold pressure (MAP) from pressure sensor 122 coupled to intake manifold 44; a measurement (ACT) of engine air amount temperature or manifold temperature from temperature sensor 117; and a engine position sensor from sensor 118 sensing crankshaft 40 position. Sensor 118 may be a variable reluctance, Hall effect, optical, or magneto-resistive sensor. Alternatively, a camshaft position sensor may also be provided and may be used to determine engine position. In a preferred aspect of the present description, engine position sensor 118 produces a predetermined number of equally spaced pulses every revolution of the crankshaft from which engine speed (RPM) can be determined.

Valve control unit (VCU) 13 communicates with controller 12 by way of two or more communication channels. Communication channel 96 is shown linking the VCU to the controller. In this example, communication channel 96 is a CAN bus that is capable of carrying data from controller 12 to the VCU or from the VCU to controller 12. Communication channel 95 is a unidirectional channel in this example, capable of transferring data from the VCU to the controller without as many communication protocol delays that may be expected with some bi-directional communication links. However, it would also be possible to use a bi-directional channel in place of the unidirectional channel. The communication channels may be comprised of hardwired connections, optical connections, or transmitted through air via radio or microwave frequencies, for example. Furthermore, a LIN bus may be used in some applications to communicate between the VCU and the engine controller. In addition, depending on the system configuration, it may also be possible to use a single channel between the VCU and the controller. Also, note that for an engine having a plurality of cylinders, a plurality of valve controllers may be used and the communication system is not limited to a configuration comprised of a valve controller and an engine controller.

Engine position information is also relayed to the VCU via crankshaft position sensor 118. In one example, VCU 13 uses crankshaft position information to determine the timing of data exchange between the VCU and the engine controller. By linking data transmission to engine position, the system can increase the possibility that data is exchanged between the VCU and the engine controller in time for subsequent engine events. For example, valve timing commands can be sent out 90 crankshaft degrees before an intake stroke so that the intake valve timing is adjusted to recent torque demand. On the other hand, if data were transmitted with little regard to engine position, then the data may arrive too late for valve timing to be adjusted during the current engine cycle.

Figure 2A:
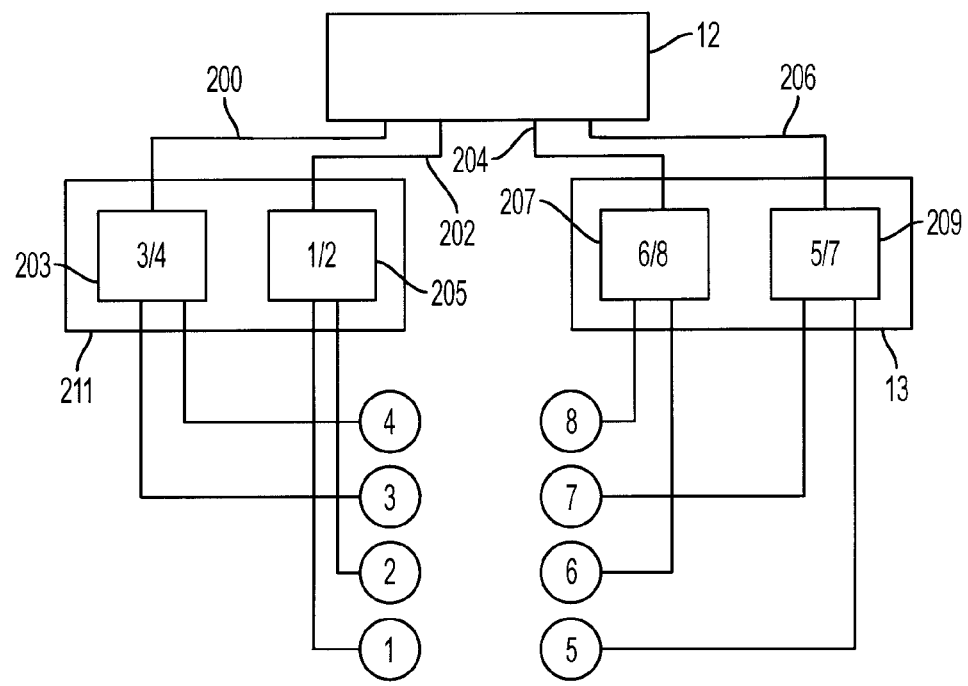
FIG. 2a is a schematic diagram of an example engine controller and valve controller configuration.

Referring now to FIG. 2a, an example schematic of a valve control system is shown. This figure shows two valve control units, 13 and 211, configured to operate and/or monitor valves for eight cylinders. The connections between each valve controller and each cylinder is shown as a single connection to simplify the figure. Valve controller 211 is shown with processors 203 and 205. Processor 203 is shown labeled with the cylinders that it controls. Namely, processor 203 controls cylinder three and four. The other processors are labeled in a similar manner (e.g., processor 209 controls cylinders five and seven). Each processor is shown in communication with controller 12 and a pair of cylinders. The processors are connected to cylinders that are separated by at least one cylinder in the predetermined firing order of the engine. For example, the engine in FIG. 2a has a firing order of 1-5-4-2-6-3-7-8; so, processor 203 is in communication with two cylinders, cylinders three and four, which are separated by two other cylinders in the predetermined firing order. Specifically, cylinders two and six separate cylinders three and four in the firing order. Processors 205, 207, and 209 are configured in a similar manner. In another example, cylinders one, four, six, and seven may comprise one cylinder group while cylinder five, two, three, and eight comprise another cylinder group. Thus, the cylinders that comprise each group of cylinders are separated from other cylinders in the group by another cylinder according to the predetermined combustion order. By configuring the valve controllers and the processors to handle data communication and control signals from cylinders that are separated by one or more cylinders in the firing order, the time available to transfer data between the valve controller and controller 12 can be increased. For example, there are ninety crankshaft angle degrees between combustion events for an eight cylinder engine. Therefore, pairing cylinders three and four allows communication to and from cylinders three and four to be separated by as much as 360 degrees, depending on system design.

The VCU processors are in communication with controller 12. Each processor is shown having a communication channel (i.e., 200, 202, 204, and 206) associated with controller 12. As mentioned above, these channels may be unidirectional, bidirectional, optical, broadcast (e.g., radio frequency or microwave), or wired between the VCU and the controller. In addition, it is also possible to have a plurality of communication channels between the respective VCU processors and controller 12. For example, each processor may be linked to controller 12 by a CAN bus and by a unidirectional channel that is used to indicate VCU or valve degradation.

This configuration shows that each VCU is associated with a single cylinder bank. Wiring between the VCU and the valves is somewhat simplified in this configuration because the VCU to cylinder wiring is confined to a single bank of cylinders. That is, VCU 211 sends and receives signals from a first cylinder bank comprising cylinders one through four and VCU 13 sends and receives signals from a second cylinder bank comprising cylinders five through eight. Alternatively, the wiring between VCU and cylinders may be designed to cross banks. For example, VCU 203 could be coupled to cylinders two and three, VCU 205 could be coupled to cylinders five and eight, VCU 207 could be coupled to cylinders one and four, and VCU 209 could be coupled to cylinders six and seven. This configuration would provide 360 degrees of separation between data transfers, but it would also allow the engine to operate as an even firing engine should the performance of one valve controller degrade.

Figure 2B:
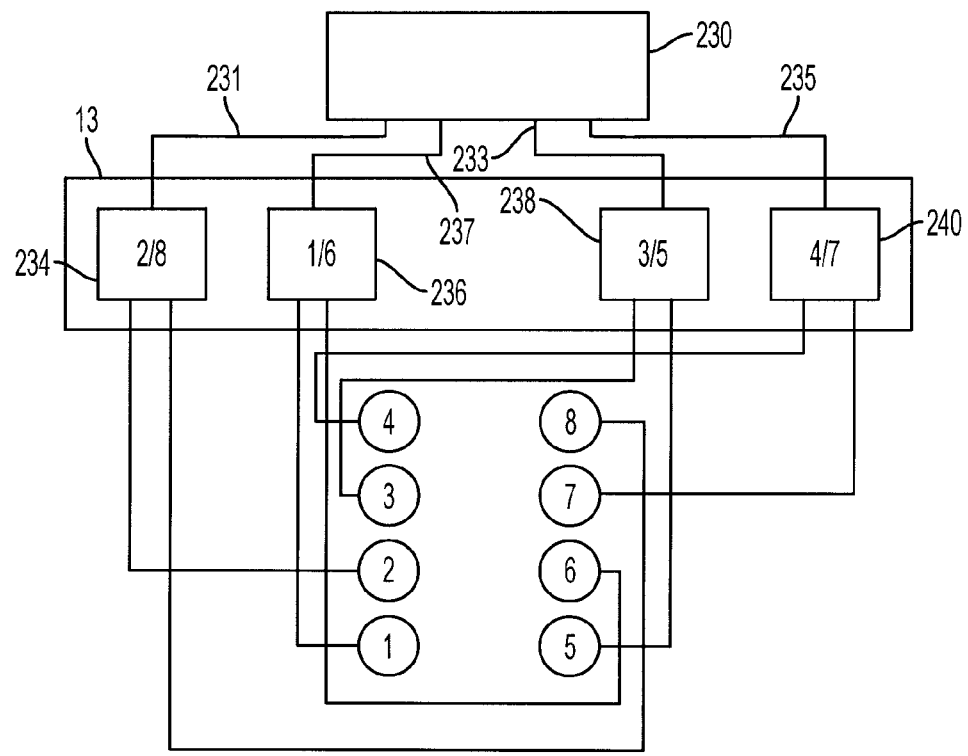
FIG. 2b is a schematic of an alternate engine controller and valve controller schematic diagram.

Referring now to FIG. 2b, an example schematic of an alternate valve control system is shown. This figure is similar to FIG. 2a, but a single VCU is shown in this figure. Engine controller 230 communicated to VCU 13 via communication channels 231, 233, 235, and 237. VCU 13 is comprised of processors 234, 236, 238, and 240. Each processor is in communication with a set of cylinders that are separated by at least one cylinder in a predetermined combustion order. In this figure, the processors are also in communication with cylinders that are separated by two cylinder events. For example, processor 234 communicates with sensors and actuators of cylinders two and eight. According to the firing order, cylinder two fires followed by cylinders six and three, then cylinder eight fires. Like the configuration of FIG. 2a, the configuration of FIG. 2b allows 360 degrees of crankshaft angle for communication between the VCU and the engine controller.

Figure 3:
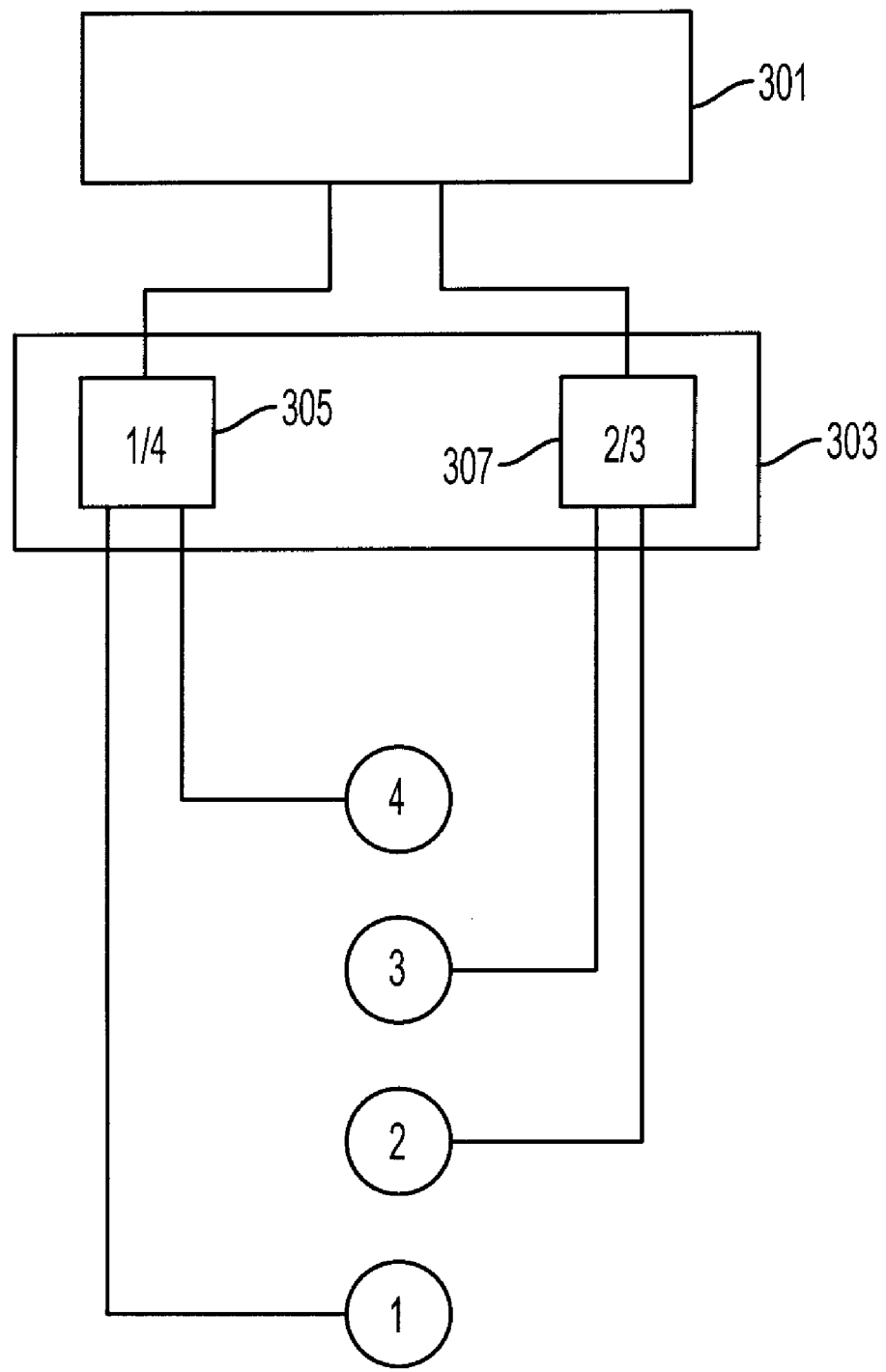
FIG. 3 is a schematic of another alternative engine controller and valve controller configuration.

Referring now to FIG. 3, an alternate system configuration for a four cylinder valve control system is shown. The figure illustrates an example system configuration for a four cylinder engine. Engine controller 301 is in communication with VCU 303 via two communication channels. VCU 303 is comprised of two processors, each processor in communication with two cylinders. Processor 305 is in communication with cylinders one and four. Again, this cylinder selection provides separation based on selecting a pair of cylinders that increases the angular distance between cylinder events of a cylinder group so that additional communication time is available between the VCU and the engine controller. The firing order of a four cylinder is 1-3-4-2. Pairing cylinders one and four provides up to 360 degrees of crankshaft angle rotation between cylinder events of the cylinder pair.

Figure 4:
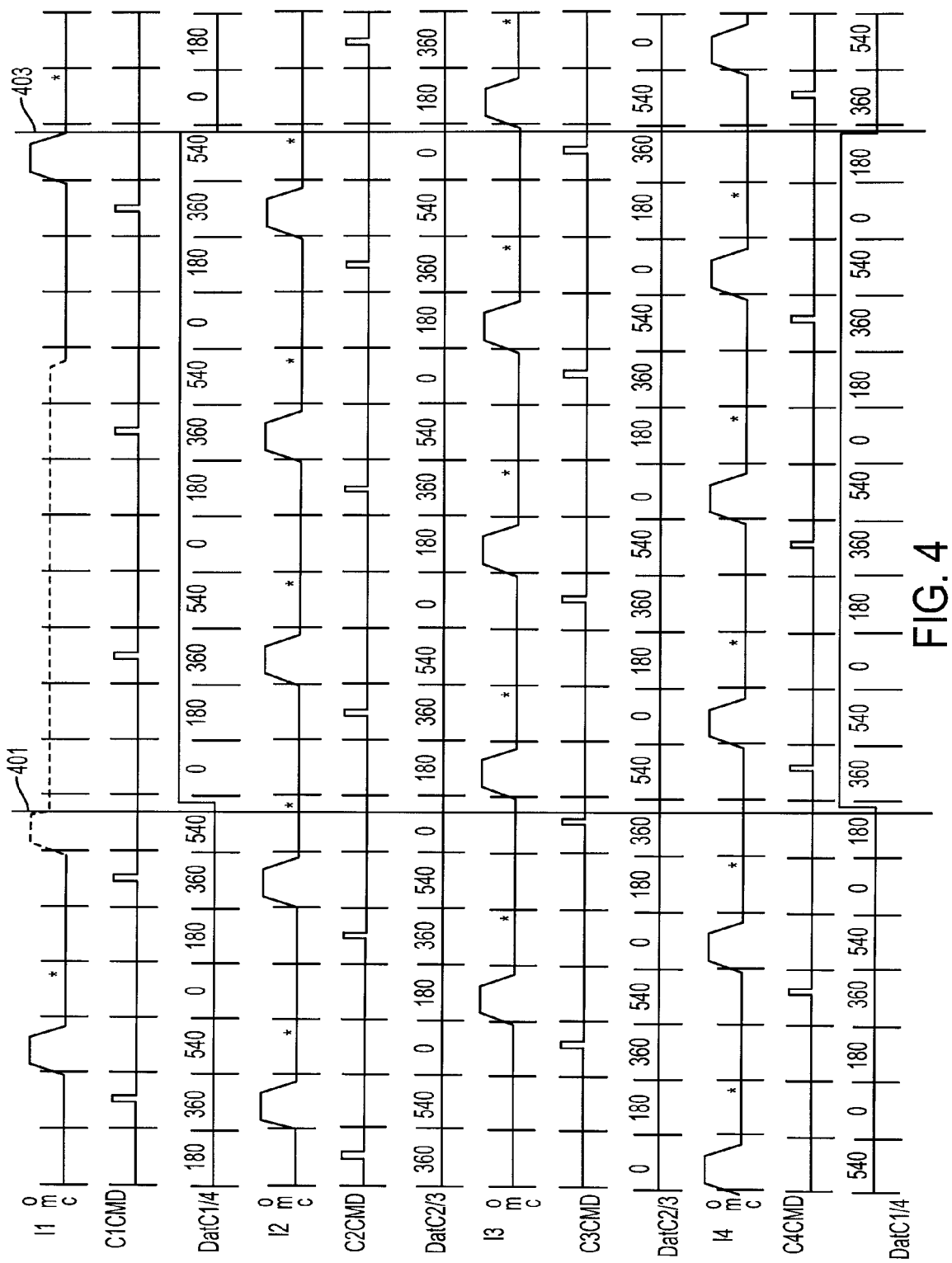
FIG. 4 is an example timing diagram for data exchange between a VCU and an engine controller.

Referring now to FIG. 4, an example timing diagram of one example data communication system is shown. The figure shows intake valve timing for a four cylinder engine. Intake valve states are indicated by traces I1-I4. Engine position is indicated by the numbers inserted near the DatC1/4 trace. The numbers represent engine position for the vertical marker that is to the right of the numeral. Directly below each intake valve trace, timing for data exchange between the VCU and the controller is shown for the respective channels. The communication channel timing for cylinder one data valve control commands is represented by the trace labeled C1CMD. The trace shows pulses that represent the data exchanged from the controller to the VCU, via a CAN link for example. Below the C1CMD trace is a trace labeled DatC1/4. This trace represents timing of data that is sent from the VCU to the controller. Cylinder spark events are shown by an *. Similar traces are shown for cylinders two through four.

In this example communication system, the valve command signals are communicated from the engine controller to the VCU over a single CAN bus. The signal traces C1CMD, C2CMD, C3CMD, and C4CMD represent the timing that is used to send the control data from the engine controller to the VCU over the CAN link. The data packets are sent approximately 90 crankshaft angle degrees before top-dead-center intake stroke so that the intake valve timing can be updated just prior to the beginning of the intake stroke. Valve control commands may be issued earlier (e.g., at 120 crankshaft angle degrees before top-dead-center) but the earlier the commands are sent, the less probability there will be that the commands will be correct when used. If the system includes electrically actuated exhaust valves then the exhaust valve commands may be sent in the same data transfer as the intake valve commands.

Signal traces DatC1/4 and DatC2/3 represent timing of data that are sent over communication channels that are associated with selected cylinders. For example, the traces that are labeled DatC1/4 are communicated over a channel that carries VCU data from cylinder one and cylinder 4 to the engine controller. This communication channel was configured to send cylinder one and cylinder four data because there is 360 crankshaft angle degrees between similar cylinder events. Whereas, if cylinder one were paired with cylinder three, then there would only be 180 crankshaft angle degrees between cylinder events. Thus, by selecting cylinders that are separated by at least one cylinder in a predetermined engine firing order, the amount of time to communicate from a VCU to an engine controller is increased.

Returning now to FIG. 4, at vertical marker 401 the intake valve of cylinder one goes to a middle position instead of a closed position. In other words, the valve is off trajectory. Shortly thereafter, DatC1/4 is set to a high level. This state is maintained until the intake valve opens and closes, or until the intake valve is determined to be back on trajectory, location 403 for example. In this example, the state of DatC1/4 indicates, from the VCU to the engine controller, that spark should be inhibited to cylinders one and four. Since this communication channel carries information for only cylinders one and four, it can transfer data between the VCU and the engine controller at a higher rate than the CAN bus that carries instructions for all four cylinders. As previously mentioned, the DatC1/4 may be comprised of a single line or of multiple lines. If DatC1/4 is configured as a simple state indicator (e.g., high=true, low=false) that is not designed to indicate which cylinder performance is degraded then the cylinder number may be transferred from the VCU to the engine controller. In this example, there is about 540 crankshaft degrees of time allotted to transfer the cylinder number from the VCU to the engine controller. As a result, the engine controller can maintain spark in cylinder four and inhibit spark in cylinder one. If engine speed increases to the point where data cannot be exchanged in time, then spark is inhibited to both cylinders.

Note that the time interval between where the valve did not close and where the spark inhibit signal is sent is very short. Since the valve commands are sent out at approximately 90 crankshaft degrees before top-dead-center of the intake stroke, and since the spark event may be scheduled between 45 crankshaft degrees before top-dead-center, there may be less than 45 crankshaft degrees for the VCU to send and for the engine controller to receive a spark inhibit signal. Since the time it takes the engine to rotate 45 crankshaft degrees varies with engine speed, it can be challenging for the spark inhibit signal to be sent and acted upon at higher engine speeds. For example, at 6000 RPM it takes 1.25 milliseconds for an engine to travel 45 crankshaft angle degrees. Also note that the engine controller sends out a valve control command to cylinder three that is proximate to the time that the spark inhibit instruction needs to be sent out in the event that cylinder one intake valve goes off trajectory. Thus, if cylinders one and three are communicating over the same channel there may be communication contention issues, and the possibility that the spark inhibit signal will arrive too late to interrupt the spark of a cylinder with an off-trajectory valve increases. Note that if DatC1/4 is a binary communication link, as opposed to a bus link, the high signal indicates either valve one or four is off trajectory. However, if DatC1/4 has capacity that exceeds a binary state then the precise cylinder having the off trajectory valve can be sent to the VCU.

At vertical marker 403, intake valve one closes and is determined to be back on trajectory. In response, DatC1/4 goes low indicating that spark is to be reactivated.

Note that cylinders two, three, and four remain operational while the intake valve of cylinder one is off trajectory. Alternatively, cylinder four could also be deactivated until cylinder one is restarted. This would allow the engine to fire evenly (i.e., cylinder combustion events are evenly spaced relative to crankshaft position).

Figure 5:
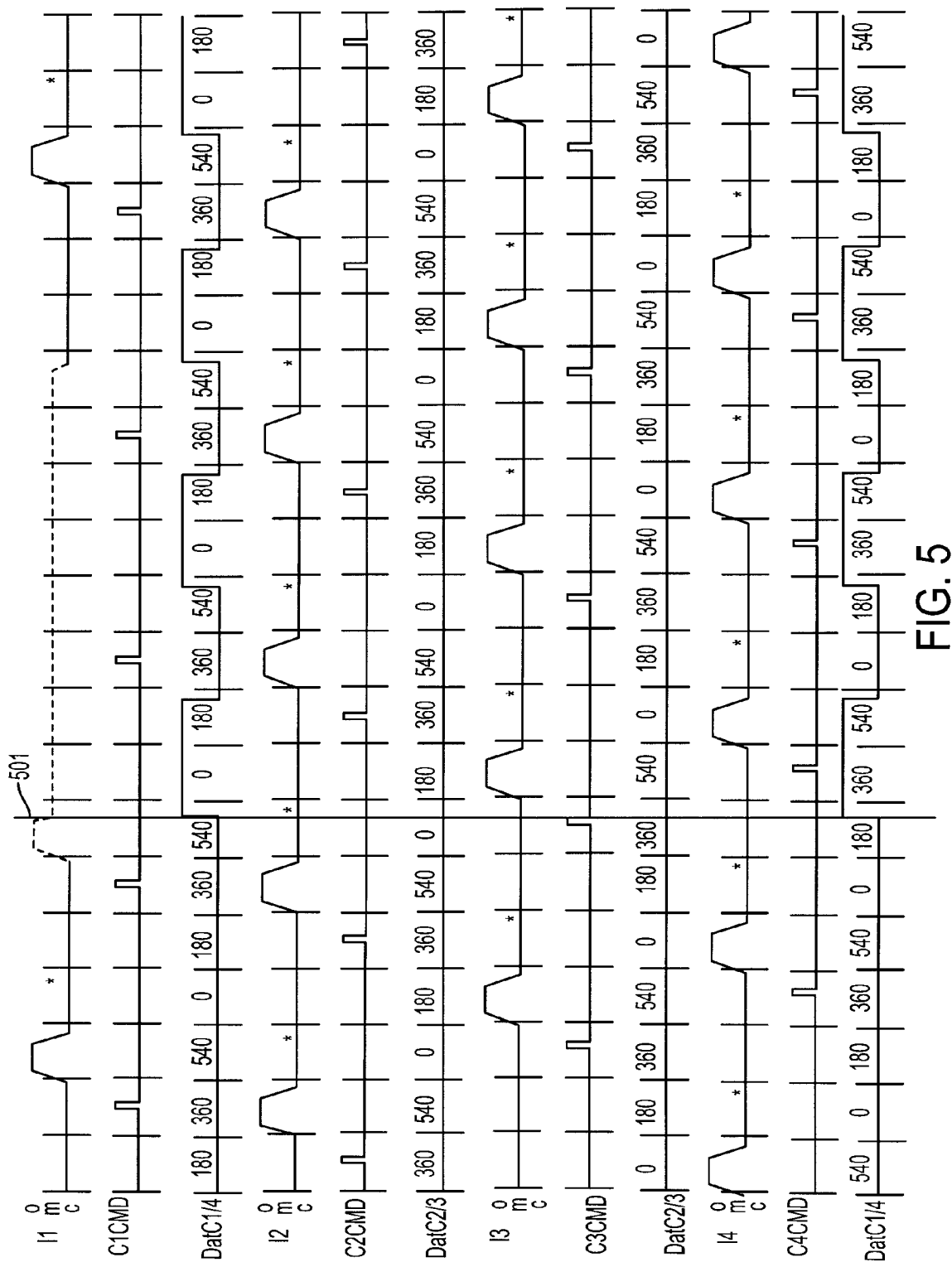
FIG. 5 is another example timing diagram for data exchange between a VCU and an engine controller.

Referring now to FIG. 5, an alternative example timing diagram of one example data communication system is shown. The signals and representative timing are similar to those shown in FIG. 4. In this example, the DatC1/4 communication channel is divided into different transmission intervals. In this example, one interval is allocated to transmitting date for cylinder one while the other interval is allocated for cylinder four. The data transmission intervals are related to crankshaft position. Individual cylinder data may be transmitted between the VCU and the engine controller over approximately 360 crankshaft angle interval, although this can be varied depending on the system design. In addition, similar to the system of FIG. 4, the cylinders are grouped together based on the engine firing order so that the transmission interval can be increased. The cylinders of a group are separated by at least one cylinder in the engine firing order. In this example, the engine firing order is 1-3-4-2; so, cylinders one and four are grouped together and separated by cylinder three. By grouping cylinders that are not consecutive in a combustion order, the communication interval for each cylinder may be increased. Note that if communication between the VCU and engine controller were purely time based, instructions could arrive during or after a period where they were intended to change valve operation.

Vertical marker 501 is used to indicate that intake valve one is off trajectory. DatC1/4 is shown transitioning to a high state. This indicates that data related to the off trajectory valve can be exchanged between the VCU and the engine controller. DatC1/4 goes low just prior to the 180 degree marker, indicating that no communication regarding cylinder four is being exchanged between the VCU and the engine controller. However, if the intake valve of cylinder four were to go off trajectory during the same interval, then the DatC1/4 would be high between the 360 and 540 engine position markers. Thus, data transmission for the respective cylinders occurs during a prescribed crankshaft angle. Of course, the timing, crankshaft interval, and cylinder grouping may be changed for this or other applications and therefore is not intended to limit the breadth or scope of the disclosure.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A system for transferring information between a first controller and an second controller, the system comprising:
   an engine having a plurality of cylinders, combustion occurring in said cylinders in a predetermined order;
   a plurality of communication channels between a first controller and a second controller;
   each channel of said plurality of communication channels carrying data associated with at least a first cylinder and a second cylinder; and
   said first cylinder and said second cylinder separated in said predetermined order by at least another cylinder.

2. The method of claim 1 wherein said first controller is a valve controller and wherein said second controller is an engine controller.

3. The method of claim 1 wherein said separation is greater than one cylinder in said predetermined order.

4. The method of claim 1 wherein said communication channels are transmitted over electrical conductors, optical signal carriers, or are broadcast through air.

5. The method of claim 1 wherein said data is an indication to inhibit spark in said first cylinder or said second cylinder.

6. The method of claim 1 wherein said predetermined order is a firing order of said engine.

7. The method of claim 1 wherein said engine is a four, five, six, eight, ten, or twelve cylinder engine.

8. The method of claim 1 wherein said valve controller adjusts the operation of electrically actuated valves.

9. The method of claim 1 wherein said first and said second cylinder are separated by two cylinders.

10. The method of claim 1 wherein said data is used to control the valve timing of said first cylinder and said second cylinder.

11. A system for transferring information between a first valve controller, a second valve controller, and an engine controller, the system comprising:
- an engine having a plurality of cylinders, combustion occurring in said cylinders in a predetermined order;
- at least a first communication channel between a first valve controller and an engine controller;
- at least a second communication channel between a second valve controller and said engine controller;
- each channel of said first communication channel carrying data associated with at least a first cylinder and a second cylinder;
- each channel of said second communication channel carrying data associated with at least a third cylinder and a fourth cylinder;
- said first cylinder and said second cylinder separated in said predetermined order by at least another cylinder; and
- said third cylinder and said fourth cylinder separated in said predetermined order by at least another cylinder.

12. The method of claim 11 wherein said first communication channel and said second communication channel are electrical conductors, optical signal carriers, or transmitted channels.

13. The method of claim 11 wherein said data is an indication to inhibit spark in said first cylinder or said second cylinder.

14. The method of claim 11 wherein said predetermined order is a firing order of said engine.

15. The method of claim 11 wherein said engine is a four, five, six, eight, ten, or twelve cylinder engine.

16. The method of claim 11 wherein said first valve controller and said second valve controller adjust the operation of electrically actuated valves.

17. A method for transferring information between a valve controller and an engine controller, the system comprising:
- transferring valve control data from a first cylinder and a second cylinder of an engine having a plurality of cylinders, combustion occurring in said plurality of cylinders in a predetermined order;
- said data transferred over a communication channel between a valve controller and an engine controller; and
- said first cylinder and said second cylinder separated in said predetermined order by at least another cylinder.

18. The method of claim 17 wherein said data is transferred from the valve controller to the engine controller.

19. The method of claim 17 wherein said data is transferred from the engine controller to the valve controller.

20. The method of claim 17 wherein said predetermined order is a firing order.

21. A system for transferring information between a valve controller and an engine controller, the system comprising:
- an engine having a plurality of cylinders, combustion occurring in said cylinders in a predetermined order;
- a plurality of communication channels between a valve controller and an engine controller;
- at least one channel of said plurality of communication channels carrying data associated with a group of cylinders; and
- cylinders in said group separated from other cylinders in said group by at least another cylinder according to said predetermined order.

22. The method of claim 21 wherein said predetermined order is the firing order of said engine.

* * * * *